July 20, 1965  H. B. EGLESTON  3,195,781
LIQUID FILLING APPARATUS
Filed Oct. 22, 1962  6 Sheets-Sheet 6
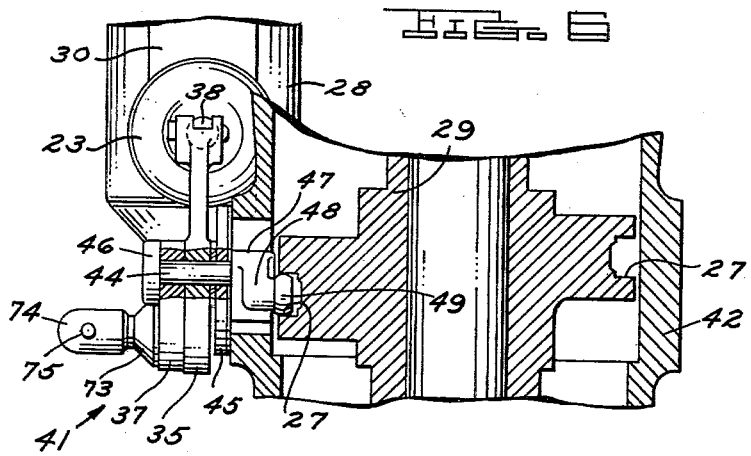
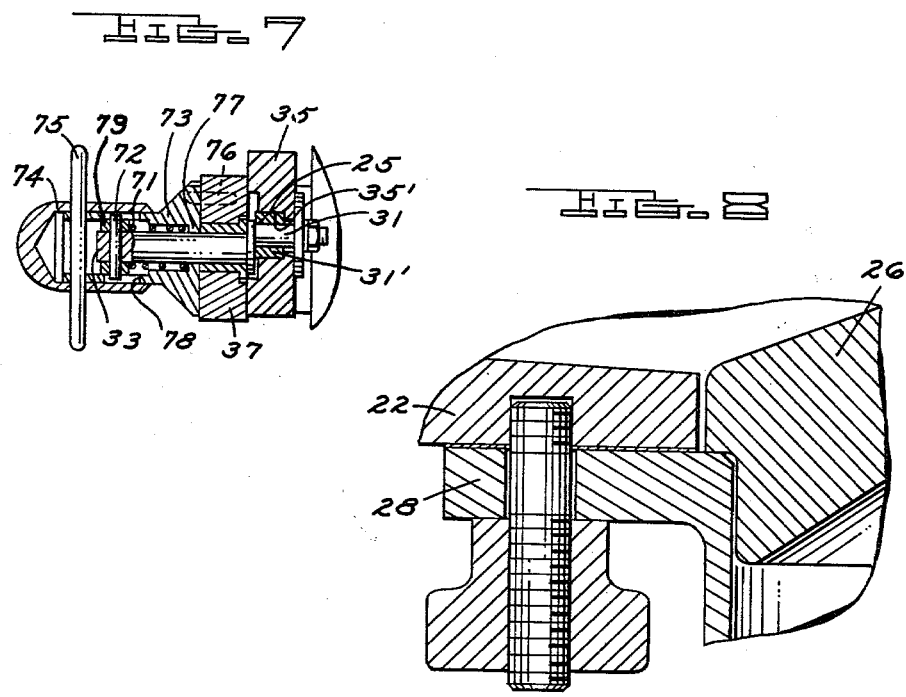
INVENTOR.
HARRY B. EGLESTON
BY
Frank B. Hill
AGENT United States Patent Office 3,195,781
Patented July 20, 1965

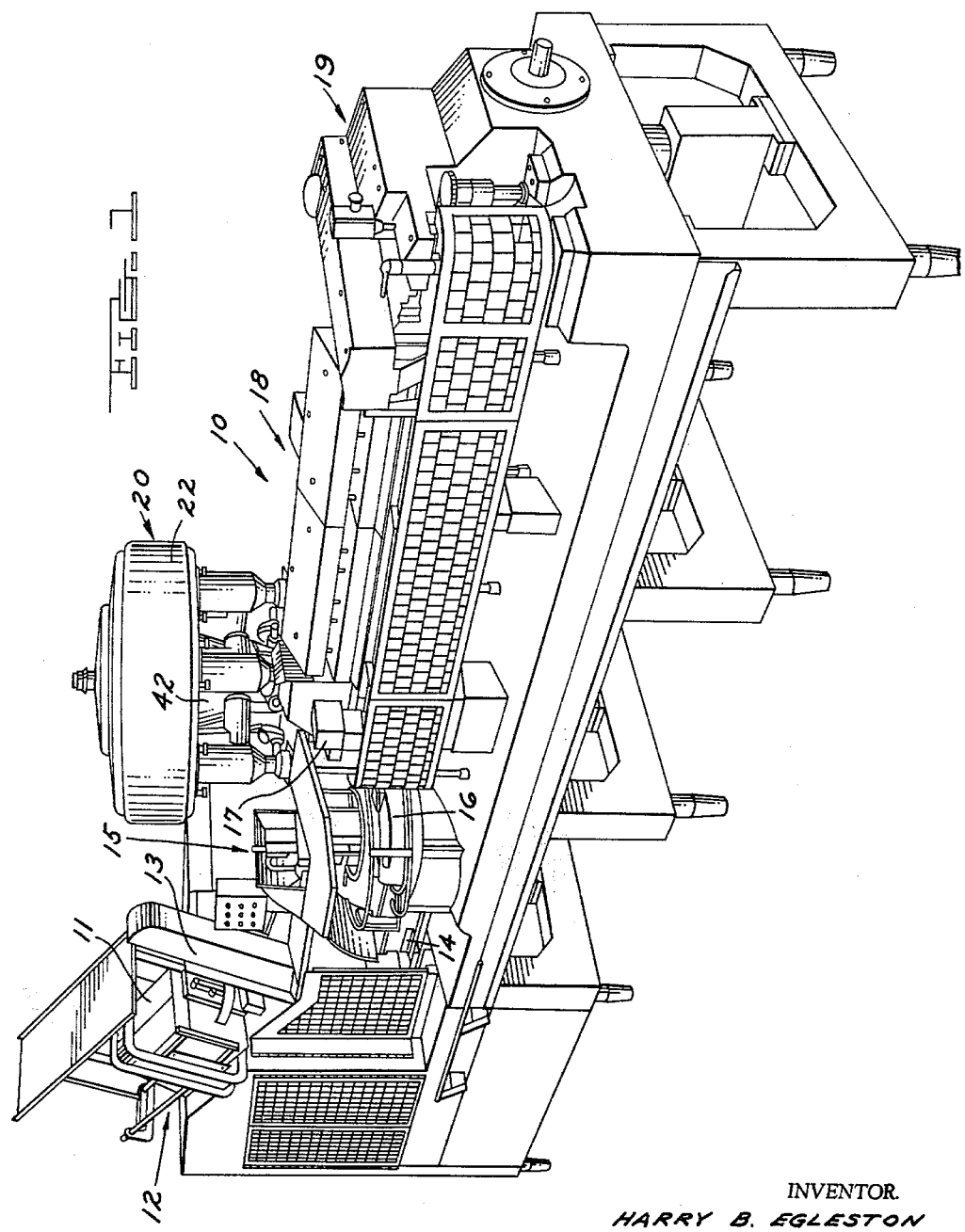

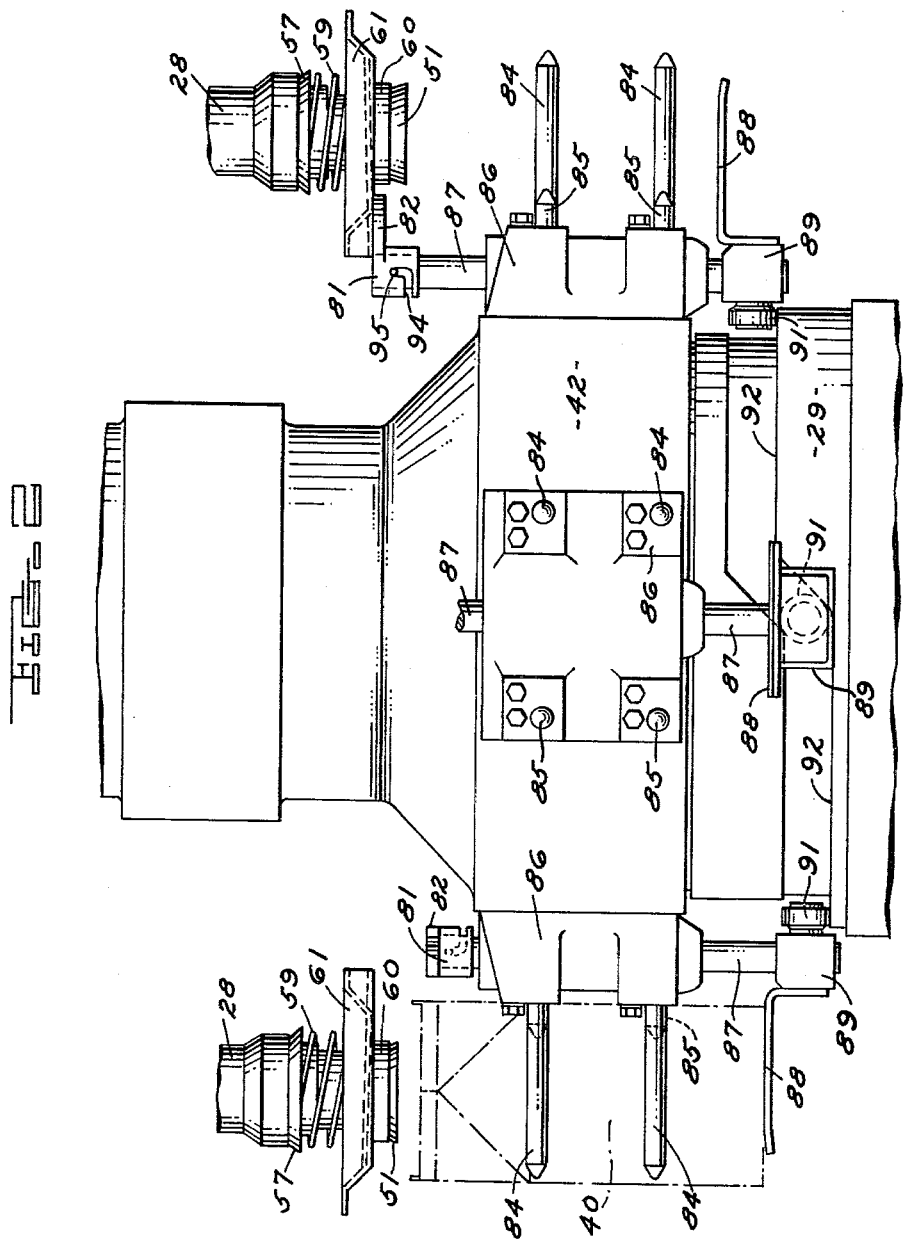

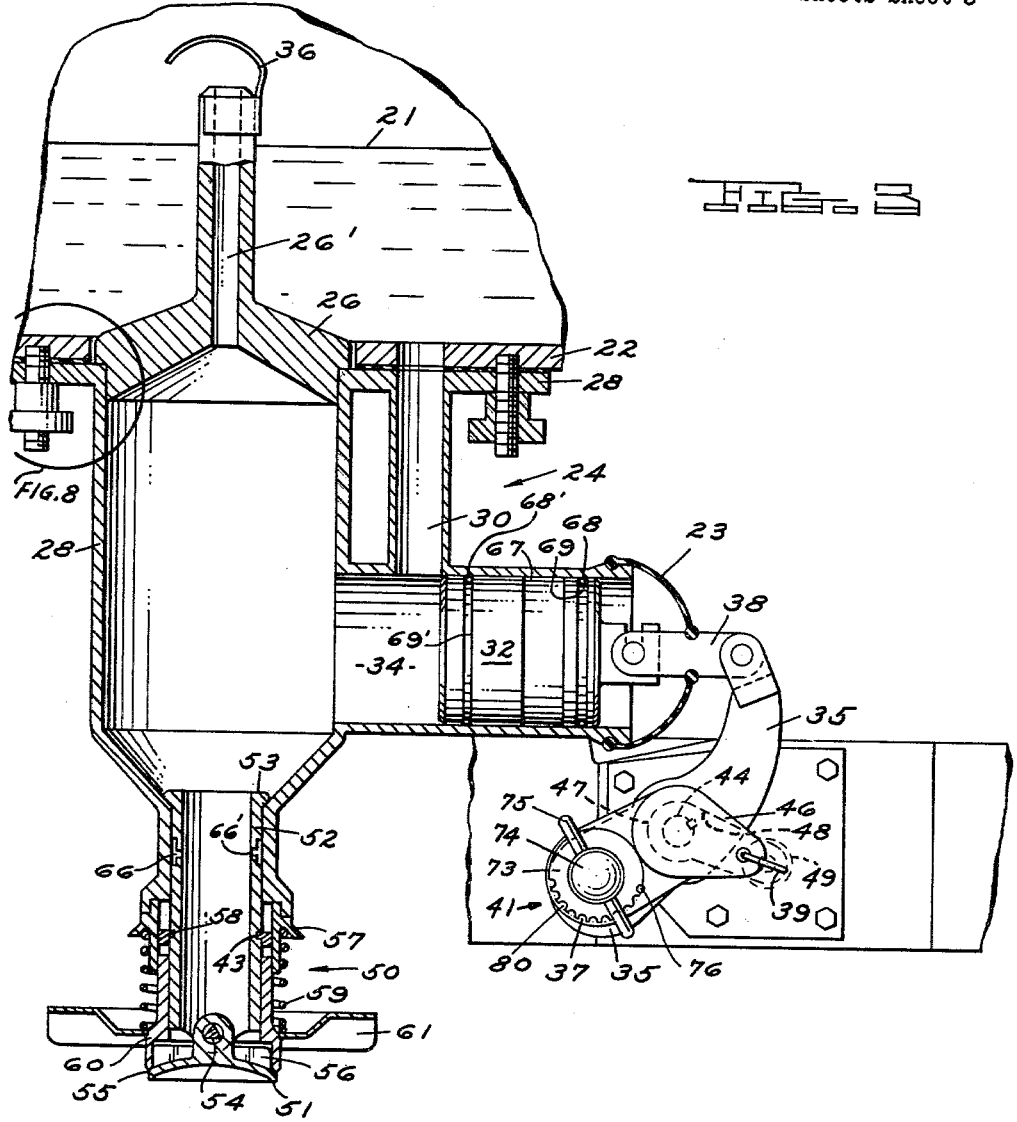

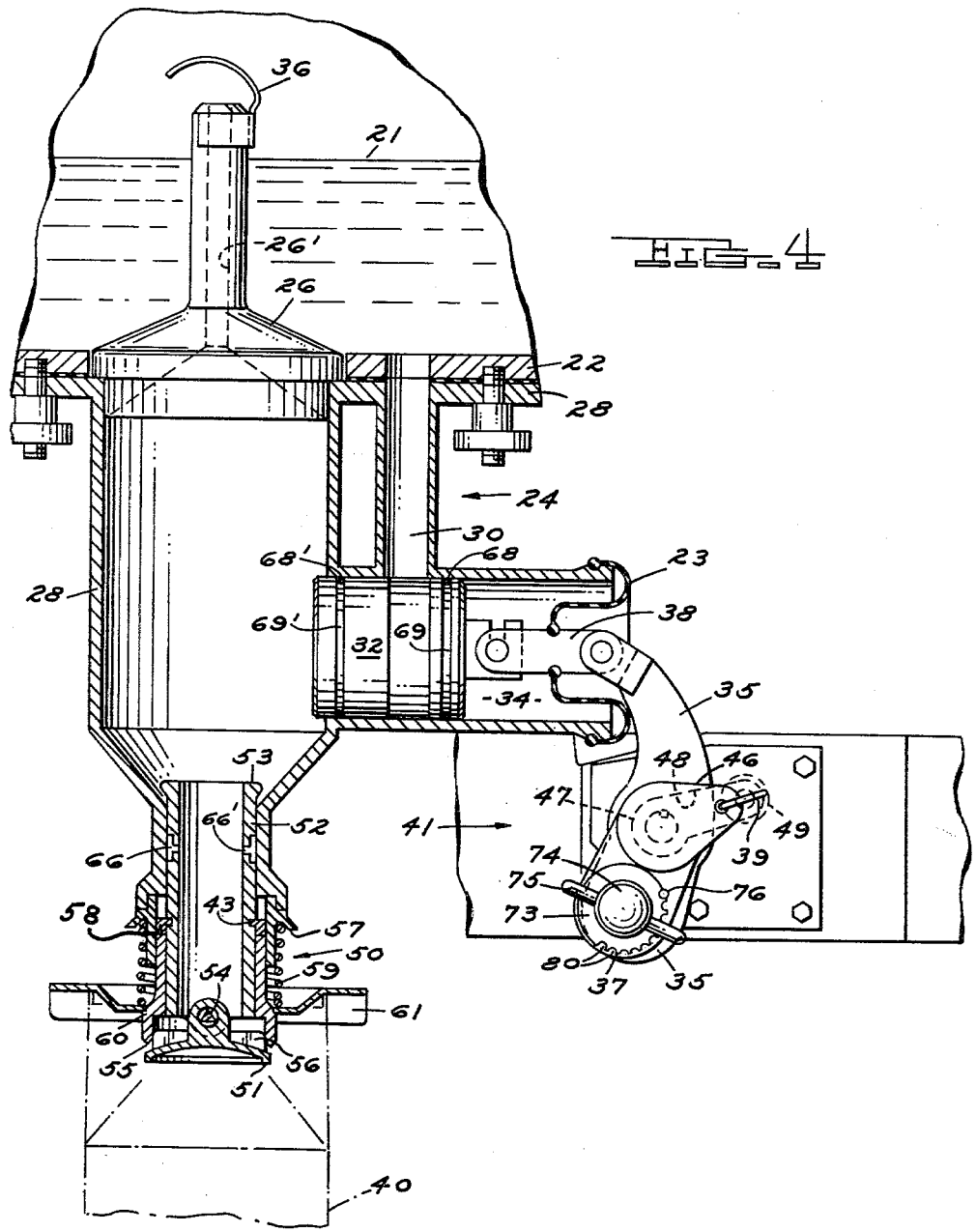

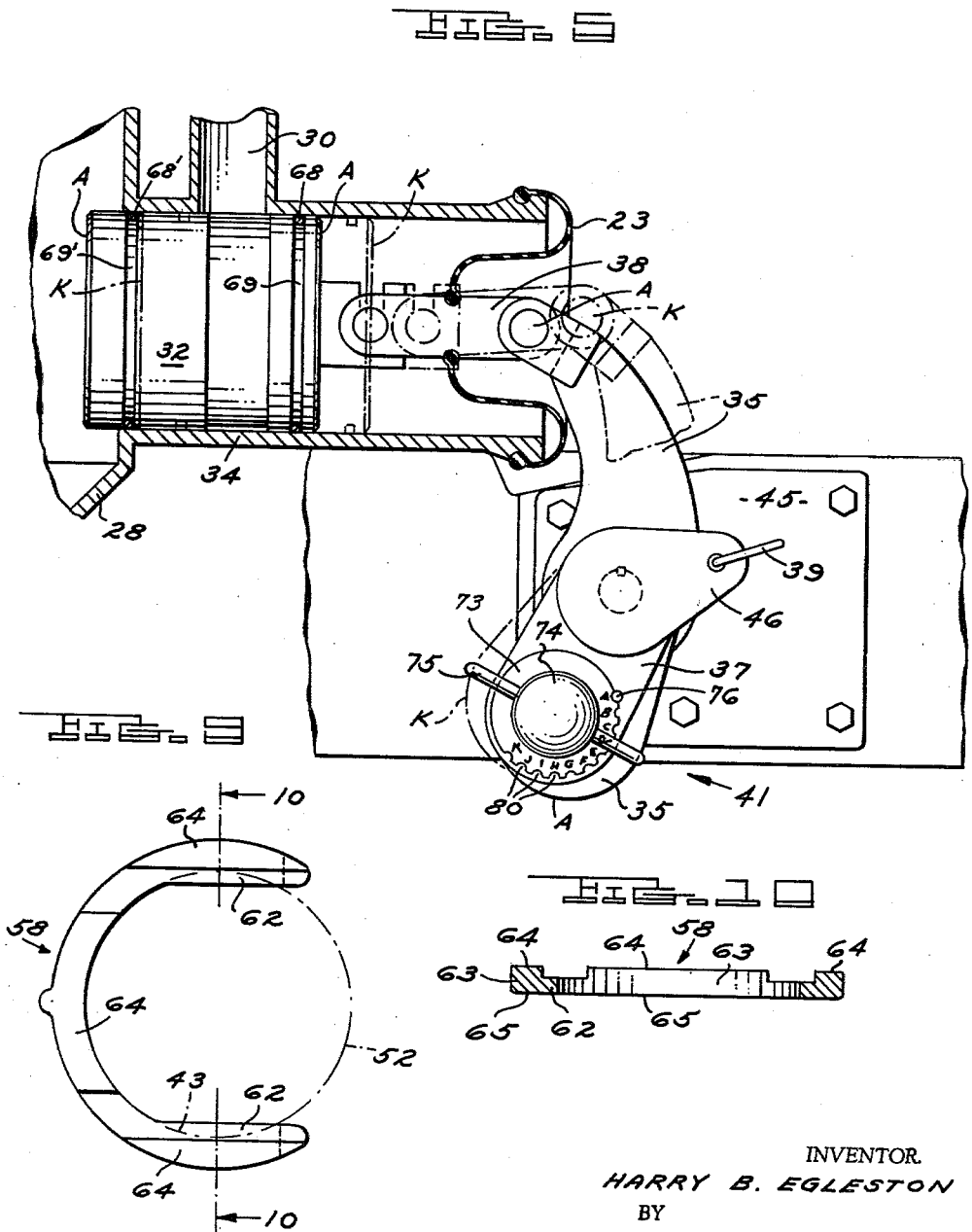

3,195,781
LIQUID FILLING APPARATUS
Harry B. Egleston, Livonia, Mich., assignor to Ex-Cell-O
Corporation, Detroit, Mich., a corporation of Michigan
Filed Oct. 22, 1962, Ser. No. 232,139
4 Claims. (Cl. 222—148)

This invention, in general, relates to a liquid filler apparatus with a metering means for securing the delivery of a specific volume of liquid and having the feature of in-place cleaning. This invention is more specifically directed to the filling of liquid comestible fluids in paperboard containers.

Sanitation has been the by-word in comestible liquid filling in all industries. The dairy industry is required to disassemble their liquid filling units after every day's run to permit sanitary cleaning. The present equipment in the dairy industry has complicated means to adjust the filling units to deliver an accurate quantity of liquid, and also complicated means to vary the valve opening for viscosity variations of the various liquids.

An objective of the present invention is to provide a liquid filler apparatus that may be sanitarily cleaned without disassembly.

Another objective of the present invention is to provide means to adjust a liquid filler apparatus so that accurate quantities of liquid will be delivered.

A further objective of the present invention is to provide a means to vary the valve opening of the liquid filler apparatus to change the flow rate of liquids having different viscosities.

Also, the objectives of the present invention includes the provision of a structure capable of accomplishing the above objectives with a minimum of material cost and fabricating expense and, at the same time, being composed of simple and ruggedly constructed elements which are reliable in operation.

Other objectives and advantages of the invention will be apparent from the following detailed description and claims, taken in connection with the accompanying drawings, which form part of the instant specification and which are to be read in conjunction therewith, and in which like reference numerals are used to indicate like parts in various views.

FIG. 1 is a side perspective view of a typical container forming and filling machine embodying the present invention;

FIG. 2 is an elevational view showing the container platform and valve system of the filler unit;

FIG. 3 is an enlarged vertical sectional view through one of the filler heads of the filler unit illustrating the valve in the closed position;

FIG. 4 is an enlarged vertical sectional view similar to FIG. 3 with the valve in an open position.

FIG. 5 is an enlarged fragmentary view detailing the piston and volume adjustment handle assemblies;

FIG. 6 is a vertical sectional view through a portion of the filler unit;

FIG. 7 is an enlarged fragmentary sectional view detailing the volume adjustment handle assembly;

FIG. 8 is an enlarged exaggerated sectional view showing the setting of the bell cap generally indicated as 26 in FIG. 3;

FIG. 9 is a plan view of the valve control ring;

FIG. 10 is a sectional view of the valve control ring taken along line 10—10 in FIG. 9.

While the invention is susceptible of various modifications and alternative constructions, certain illustrative embodiments have been shown in the drawings and will be described below in considerable detail. It should be understood, however, that there is no intention to limit the invention to the specific forms disclosed, but, on the contrary, the intention is to cover all modifications, alternative constructions and equivalents falling within the spirit and scope of the invention as expressed in the appended claims.

Referring more specifically to FIG. 1, the invention is there shown exemplified in a novel machine 10 for fabricating containers of paperboard, or the like, having a filler unit 20 embodying the present invention. The machine 10 is adapted to receive a supply of flat tubular blanks 11, which are appropriately cut and scored, and to so operate on them in such a manner that a supply of formed, filled and sealed containers are discharged therefrom.

In the course of such operation, each flat tubular blank is withdrawn from a magazine 12 by means of a feeding mechanism 13 onto a mandrel assembly for bottom forming, not shown in the figures, and then conveyed by a transfer mechanism 14 to the top breaker unit 15. The bottom formed container is then moved to the filler unit 20 by the rotary transfer means 16. After the container is filled, it is moved to the top steepler unit 17, and then into the top heater unit 18, where the top members are heated until they arrive at the top sealer unit 19, where the container top is bonded. At this station the container is discharged from the machine as a completed, formed, filled and sealed container.

*General filler description*

The filling unit incorporates a liquid measuring feature which includes a metering system, metering actuation, and metering adjustment. This feature controls the volume of liquid which will be dispensed into the container and the time period during which the liquid will be metered before filling. The filler unit also includes a valve unit which controls the time during which the metered liquid passes into the container. The valve unit also prevents liquid from being discharged when a container is not in fill position. An additional feature of the filling unit is the self cleaning aspect, or commonly referred to as a "clean in place" feature. This feature allows the filler unit to be cleaned without disassembly.

*Filler metering feature*

Referring primarily to FIGS. 1, 3, 4 and 5, the metering feature incorporated in this invention will be explained in detail. The metering unit is generally indicated as 24, having a bell cap 26, filler housing 28, inlet passage 30, filler cylinder housing 34, and filler cylinder piston 32. The liquid level stored in filler bowl 22 will be maintained at a level approximately at line 21, which is below the top of bell cap 26.

With the metering unit 24 in the position shown in FIG. 3, the liquid will pass from the filler bowl 22 through the inlet passage 30 into the filler cylinder housing 34, and then into the filler housing 28. The liquid will fill the housing 28 completely and extend on up into the liquid passage 26' to a level equal with liquid level 21. The liquid is contained in the filler housing 28 by dispensing valve 51, which is in the closed position as seen in FIG. 3. To complete the metering of the liquid, piston 32 is moved forward, to the left, as seen in FIG. 3, to the final metering position, as shown in FIG. 4. As the piston 32 moves forward, O-ring 68' in O-ring groove 69' will seal against the inside periphery of filler cylinder housing 34, between the inlet passage 30 and the filler housing 28, preventing the passage of liquid from the passage 30 to the housing 28. Another purpose of this O-ring 68' and O-ring groove 69' will be explained in more detail later in the specification. As the piston 32 continues forward, the liquid will be forced to rise in liquid passage 26' and flow back into the filler bowl 22. To prevent the discharged liquid from shooting to the top of the filler bowl, a fluid deflector 36 directs the liquid toward the bottom of the filler bowl 22. When the piston 32 has reached its final position, as shown in FIG. 4, the liquid will be levelled at the top of the bell cap 26. In this position, the filler unit contains a metered amount of liquid. After the metering sequence, the valve unit 50 is opened and the metered liquid is allowed to flow into container 40. The details of the valve unit will be explained later in the specification.

Referring generally to FIGS. 1, 3, 4, and 6, the metering actuation mechanism will be explained in detail. The filler bowl 22 is mounted on top of rotatable outer housing 42. The filler housing 28 extends down from the filler bowl 22 and is adjacent the outer housing 42. Adjustment handle unit 41 is connected to the filler cylinder piston 32 through piston rod 38. The metering adjustment handle unit 41 is attached to the outer housing 42 by cam follower shaft 44. The cam follower shaft 44 is supported by cam plate 45 and rotatable in plate 45. The cam plate 45 is stationary with respect to outer housing 42. The cam follower shaft 44 has a drive lever 46 at one end and a cam follower arm support 47 at the opposite end. Extending radially from the shaft 44 on the cam follower arm support 47, is a cam follower arm 48, which has cam follower 49 on its end. The cam follower 49 is housed in cam track 27, which is part of stationary support column 29. The drive lever 46 is connected to piston adjustment lever 37 through shear pin 39.

Referring to FIG. 7, the piston adjustment lever 37 is connected to piston lever 35 through adjustment shaft 33 and eccentric shaft 31, which is attached to adjustment shaft 33 by adjustment shaft flange 25. As cam follower 49 moves along and is raised by cam track 27, the arm 48 will be rotated about shaft 44, which in turn will cause drive lever 46 to be rotated. As viewed in FIG. 3, the drive lever 46 will be rotated in a counter-clockwise direction. It will in turn rotate piston adjustment lever 37 in a counter-clockwise direction about shaft 44. As lever 37 rotates, it will rotate piston lever 35 in the same direction, causing the filler cylinder piston 32 to be moved to the metered position towards filler housing 28. As the cam follower 49 continues to move along and is lowered by cam track 27, the operation will reverse so that filler cylinder piston 32 will be returned to the fill position, allowing a new supply of liquid to fill the metering unit 24 and be ready to fill the next container. Flexible cover 23 is snapped to filler cylinder housing 34 and piston rod 38, preventing foreign matter from getting to the rear of piston 32.

The metered volume of this filler is controlled by the initial starting position of piston 32 and its end position 32, which determines the amount of liquid metered. At all positions the stroke length of piston 32 will be the same. Only the initial and end positions will be altered. To change the initial starting position of piston 32, the relationship between the piston lever 35 and the piston adjustment lever 37 is changed. This is accomplished through the metering adjustment handle unit 41.

Referring generally to FIGS. 5 and 7, we have a handle 75 and a handle cap 74, which has an adjustment disc 73 secured to it. Adjustment disc 73 is mounted on adjustment shaft 33 by shoulder 77 and bushing 79. Spring 71 is contained in disc 73 and acts on guide pin 72 through bushing 79. Guide pin 72, in turn, acts on adjustment disc 73 through shoulder 77, forcing it towards piston adjustment lever 37. In operating position, the adjustment disc 73 is rotated with adjustment shaft 33 by guide pin 72 acting on slot 78. As viewed in FIG. 5, the adjustment disc 73 has a multiple number of disc notches 80, which may be connected with pin stop 76. To accomplish this, an operator may merely pull on handle 75, which causes spring 71 to compress and lifts adjustment disc 73 away from piston adjustment lever 37 and pin stop 76. The handle unit 41 is rotated so a new notch 80 is aligned and engaged with pin 76. As the handle is rotated, the disc 73 acts on guide pin 72 through slot 78, causing shaft 33 to rotate with it. This causes piston lever 35 to be positioned at a different station with respect to lever 37. This is caused by eccentric shaft 31 acting through guide block 31', which slides in slot 35', causing lever 35 to move away from lever 37. FIG. 5 shows the variance between position A and K of disc notches 80. The solid line shows the location of the filler unit when the pin stop 76 is locating in notch A. The dotted lines, a phantom representation of portions of the system, show the filler unit when the stop pin is in position K. This arrangement will give the range of adjustment which is required in a filler unit. These positions shown in FIG. 5 are at the end of a stroke or the metered position. Therefore, it is seen that position A will give the minimum metered volume, and position K will give the maximum metered volume. This adjustment is easily accessible to the operator without shutting down the complete operation.

*Filler valve feature*

Referring generally to FIGS. 3 and 4, I will explain the valve assembly in detail. There is an inner sleeve 52, housed in filler housing 28, having sleeve lobe 53, and it is housed in the filler housing 28. At the outlet end of the valve we have a dispensing valve 51, which is freely connected to the inner sleeve 52 by pin 54.

Valve bushing 60 is mounted around the end of inner sleeve 52 and is located between the spring stop 57 and the sleeve 52. Valve spring 59 surrounds the valve bushing 60 and is compressed between the drip pan 61 and the spring stop 57. The spring 59 forces the bushing 60 over the end of the dispensing valve 51. The bushing 60 then acts on the valve shoulder 55 sealing the outlet, thus preventing any flow of liquid until the shoulder 55 and bushing 60 are separated. The dispensing valve 51 has valve guides 56 attached to it, which permit the bushing 60 to slide relative to the dispensing valve 51 and remain in alignment. For example, in the present disclosure there are four valve guides 56 at approximately 90° from each other, with two visible in FIGS. 3 and 4. The liquid flows to the container 40 between these four guide members 56.

FIG. 3 shows the filler unit while in the initial metering position. In this position the valve unit 50 is closed and the piston 32 is in its rearward position so that the liquid may flow into the filler unit through inlet passage 30. FIG. 4 illustrates the filler unit after the liquid has been metered and the valve unit 50 is open to permit the liquid to flow into the container 40.

The valve unit 50 is opened by raising container 40, as will be explained later in a specification, so that the drip pan 61 is lifted, compressing spring 59, causing the bushing 60 to break the seal it had with the valve shoulder 55. In this position the liquid will flow from the meter chamber across valve shoulder 55 into the container 40. The orifice opening of the valve unit 50 is controlled to a predetermined size when the bushing 60 contacts the valve control ring 58. At this time, the sleeve 52, with its attached parts, will be raised, thus maintaining a contact relationship between the bushing 60 and dispensing valve 51.

Referring generally to FIGS. 9 and 10, the valve control ring 58 will be discussed in detail. The ring 58 has flange 62 that is secured in sleeve groove 43 in inner sleeve 52. The ring 58 and sleeve 52 are so constructed that either stop surface 64 or 65 may be up or down. If stop surface 64 is down, the orifice opening will be less than if stop surface 65 is down. The valve control ring 58 is easily reversed, putting either surface 64 or 65 down by pulling spring stop 57 down compressing valve spring 59 permitting access to the ring 58. The valve control is just below the bottom end of filler housing 28 which permits ring 58 to be pulled from groove 43, reversed and placed back on groove 43. The spring stop 57 is moved back to its upward position and the filler unit is ready for operation. This adjustment is to help facilitate the flow of the metered liquid from the meter chamber for liquids of different viscosities.

Generally referring to FIG. 2, the valve actuation system is illustrated wherein shaft support 86 is secured to rotatable outer housing 42. A platform shaft 87 extends through the shaft support 86 in a vertical direction. At one end of the shaft 87 is a valve lifter 81 incorporating a valve lifter flange 82 which can raise the drip pan 61, and its operation is explained later in the specification. At the opposite end of the shaft 87 is a platform support 89, supporting platform 88 on one side and a cam follower 91 on the opposite side. Platform 88 supports the container 40 while it is passing through the filler unit. Cam follower 91 follows cam track and is actuated in an up and down direction, moving the platform shaft 87 and its associated parts within. Valve lifter 81 is seen in its filling position in the left view in FIG. 2 and in the "clean in place" position in the right view. Considering the left view in FIG. 2, the normal position of valve lifter 81 is such that valve lifter 81 does not contact and actuate drip pan 61 in its up and down travel. The shaft support 86, being secured to outer housing 42, rotates with housing 42. The cam track 92, being integral with stationary support column 29, remains stationary as the outer housing 42 rotates about it. When container 40 is on platform 88, the valve unit 50 will be open as when the cam follower 91 is moved to the up position, as viewed on the right side of FIG. 2. Outer housing 42 continues to rotate, and cam follower 91 follows cam track 92; as the cam track moves downward, the cam follower 91 moves downward, resulting in container 40 being withdrawn from contact with drip pan 61 and allowing the valve unit 50 to close. The container 40 is pushed by pusher pins 84 and is guided by guide pins 85 into proper position under the valve unit 50.

Referring generally to FIGS. 2 and 6, the cam tracks 92 and 27 are so coordinated that as the container 40 is received on platform 88 of the rotating filler unit 20, cam track 92 raises the container 40 to open the valve unit 50 so it can discharge the metered liquid. After the container is filled, the cam 92 will be dropped down moving the filled container 40 out of contact with drip pan 61 closing valve unit 50. At this time, cam track 27 will be lowered moving the piston 32 to its rearward position so that new liquid is received by the metering unit. After this fluid is allowed to flow in, cam track 27 moves up, causing piston 32 to move forward to metered position providing a new metered volume of liquid. A new container 40 is placed on platform 88 and moves up to open the valve unit 50 and receives the metered volume of liquid. This permits continual motion filling, therefore, eliminating stop and start movement for filling on machines this filler unit is to be associated with.

*"Clean in place" feature*

Referring generally to FIGS. 2, 3, 5 and 8, the "clean in place" features of this filler unit will be explained in detail. The present mechanism is so designed that cleaner solution may be operated through the filler unit while the operator is going about other tasks. Also, the disassembly of the filler unit will not be required for sanitary washing. When the unit is to be cleaned, there will not longer be liquid in the filler bowl 22. At this time, a stationary trough, not shown in the drawings, would be positioned under the discharge stations of valve units 50 to receive the cleaning fluid as it is flushed through the filler unit and comes out the dispensing valve 51. The cleaning fluid would be drained from the trough black to a pump, not shown in the drawings, which in turn pumps the cleaning fluid back into the filler bowl, allowing it to operate through the filler unit in the same manner the liquid product, such as milk, passes through the filler unit.

Referring generally to FIGS. 3 and 8, it should be noted that the bell cap 26 is merely placed over the filler housing 28 in the filler bowl 22 and maintains its position by gravity. As the piston 32 moves forward and starts discharging liquid through liquid passage 26', pressure is developed in the filler housing 28. The only member that is movable as a result of this pressure is bell cap 26. The liquid passage 26' through which the fluid is discharged, is smaller than the filler cylinder housing area 34. Therefore, the cap 26 is raised slightly up from the filler housing 28.

As viewed in FIG. 8, the bell cap 26 meets the housing 28 forming a slight gap, of a few thousandths, between the axial circumferences of members 26 and 28. When cap 26 is raised, there is a small gap between the flange of housing 28 and the shoulder portion of cap 26. This also permits the cleaner fluid to pass over and thoroughly clean all the surfaces which contact the liquid product when it is filled, and is commonly referred to as a "self-breathing" feature.

Piston 32 is so constructed that it has a piston groove 67 and O-ring grooves 69–69' which house O-rings 68 and 68'. When the piston 32 is in the rearward position, the cleaning solution will come down inlet passage 30 contacting all the surfaces and will flow into the filler cylinder housing 34 contacting all the surface ahead of piston 32. As piston 32 moves to the forward position, piston groove 67 and O-ring groove 69' receive cleaner solution from the filler bowl through inlet passage 30. As the piston 32 returns again to its rearward position, this will move the cleaner solution along the wall of filler cylinder housing 34, which is behind the front face of piston 32, permitting these surfaces to be cleaned with an ample amount of cleaner fluid. As the cleaner fluid seeps around the surfaces of piston 32, it will work itself in groove 69. The O-rings 68, 68' are so constructed that they are slightly compressed when in the assembled sealing position. In this manner O-rings 68, 68' roll back and forth in O-ring grooves 69, 69', allowing cleaner solution to clean their complete circumferences and the complete area of the grooves.

In the valve unit we will have a groove 66 in the middle portion of the inner sleeve 52. The groove 66 has several small passages 66' which permit cleaning solution to move into the groove 66 and down between the inner and outer walls of filler housing 28 and inner sleeve 52, respectively. Dispensing valve 51 will have the cleaner fluid pass over its surfaces as it runs into the trough. It should be noted that the valve pin is of triangular cross-section permitting the solution to wash around it and pass through its supporting points to clean them thoroughly.

Upon completion of a run of liquid product through the filler unit, the unit will be flushed with water. After the water is flushed through, the cleaner fluid is placed into the system and allowed to clean the filler unit. The cleaner fluid is run through the cycle for several minutes. After which, water is run through the unit flushing out the remaining cleaner fluid. The water will be drained and the machine will be cycled several times, allowing the remaining water to work itself through the unit. After the unit is cleaned, a new supply of liquid product is supplied to the unit, the small amount of water remaining in the filler unit being so minute that it will be of no consequence.

During the flushing cycle the valve unit 50 is opened by valve lifter flange 82, which contacts the drip pan 61 as the platform shaft 87 is raised. This occurs at the same time the container 40 would open the valve unit 50. To put the valve lifter in the clean in place position, it is merely required to raise the valve lifter 81 with respect to the platform shaft 87 and rotate it 90°, thus placing the valve lifter flange 82 under the drip pan 61, so that it may contact the drip pan as it is raised. The valve lifter 81 has a U-shaped slot 94. One vertical arm of the U-shaped slot 94 is shown in the right view of FIG. 2. The second vertical arm is out of view but 90° from the first arm, permitting positioning of the flange 82 ninety degrees from its "clean in place" position, which is similar to the left view of FIG. 2.

While the embodiments of the present invention, as herein disclosed constitute a preferred form, it is to be understood that other forms might be adopted and still be within the sphere of my invention.

I claim as my invention:

1. A filler unit for a liquid container filling machine having a controlled unvarying liquid level comprising, in combination,
   (a) a liquid supply filler bowl,
   (b) a filler housing mounted to the filler bowl,
   (c) an inlet passage mounted to said filler bowl,
   (d) a filler cylinder housing adjacent to and connecting the inlet passage and the filler housing,
   (e) a piston and piston actuation means positioned within and adjacent to said filler cylinder housing,
   (f) a bell cap as part of said filler housing,
   (g) said bell cap having a liquid passage extending above the controlled unvarying liquid level permitting passage of liquid from the filler housing into the filler bowl and preventing passage of liquid from the filler bowl into the filler housing,
   (h) said piston and piston actuation means controlling the amount of liquid in the filler housing by closing the inlet passage and discharging liquid through the bell cap liquid passage until the desired amount of liquid remains in the filler housing.
   (i) a valve unit to dispense the liquid from the filler housing after the piston and piston actuation means meters the desired amount of liquid in the filler housing, and
   (j) said valve unit operating independent of the piston actuation means.

2. A filler unit as defined in claim 1, wherein said piston means comprises,
   (a) a piston groove and two O-ring grooves,
   (b) said piston groove having an O-ring groove at each side of the piston groove, and
   (c) each of said O-ring grooves having slightly compressed O-rings acting against said filler cylinder wall.

3. A "clean in place" filler unit as defined in claim 4, wherein said dispensing means comprises,
   (a) an inner sleeve housed in portion of the said filler housing having a dispensing valve attached to its outer end,
   (b) a valve bushing over part of said inner sleeve and contactable with said dispensing valve, and
   (c) a sleeve groove around the outside of said sleeve having small passages connected with the inner surface of the sleeve to receive cleaner fluid from the small passages to transmit the cleaner fluid to the surfaces which need to be cleaned between the inner sleeve and the filler housing.

4. A "clean in place" filler unit for a liquid container filling machine comprising, in combination,
   (a) a cleaner fluid supply filler bowl,
   (b) a filler housing to receive cleaner fluid and having a continuously opened passage in one end,
   (c) a cylinder communicating with said filler housing and having an inlet passage communicating with said filler bowl,
   (d) a piston in said cylinder having means to receive cleaner fluid from said inlet passage to transmit the cleaner fluid to the cylinder walls,
   (e) means for dispensing cleaner fluid from said filler unit,
   (f) a piston groove and two O-ring grooves,
   (g) said piston groove having an O-ring groove at each side of the piston groove,
   (h) each of said O-ring grooves having slightly compressed O-rings acting against said cylinder wall, and
   (i) said O-ring will roll back and forth in said O-ring groove permitting the cleaner fluid to contact all O-rings and O-ring groove surfaces.

References Cited by the Examiner

UNITED STATES PATENTS

| | | | |
|---|---|---|---|
| 1,254,190 | 1/18 | Baker | 222—309 X |
| 1,271,107 | 7/18 | Weller | 222—148 |
| 1,287,141 | 12/18 | Travis | 222—442 |
| 1,579,434 | 4/26 | Brombaker | 222—309 X |
| 1,695,501 | 12/28 | Opitz | 222—287 |
| 2,321,241 | 6/43 | Quick | 222—318 X |
| 2,784,885 | 3/57 | Kneisley et al. | 222—439 |
| 2,792,156 | 5/57 | Camp | 222—309 |
| 2,880,766 | 4/59 | Luther | 141—292 |

RAPHAEL M. LUPO, *Primary Examiner.*